United States Patent [19]

Colarelli, III

[11] Patent Number: 4,879,670
[45] Date of Patent: Nov. 7, 1989

[54] VEHICLE WHEEL ALIGNMENT TRANSDUCER, SYSTEM AND METHOD

[75] Inventor: Nicholas J. Colarelli, III, St. Louis County, Mo.

[73] Assignee: Hunter Engineering Company, Bridgeton, Mo.

[21] Appl. No.: 115,117

[22] Filed: Nov. 2, 1987

[51] Int. Cl.$^4$ .............................................. G01B 7/00
[52] U.S. Cl. .............................. 364/559; 364/424.03; 33/336; 33/365; 33/203.18
[58] Field of Search .................. 280/661; 33/203.14, 33/203.18, 288, 335, 203.19, 203.20, 336, 366, 301; 364/424.03, 424.04, 559

[56] References Cited

U.S. PATENT DOCUMENTS

| 3,758,958 | 9/1978 | Jordan | 33/203.18 X |
| 3,892,042 | 7/1975 | Senften | 33/301 |
| 4,180,915 | 1/1980 | Lill | 33/203.19 X |
| 4,192,074 | 3/1980 | Chang | 33/288 X |
| 4,261,108 | 4/1981 | Davis | 33/203.18 X |
| 4,389,793 | 6/1983 | Butler | 33/203.14 X |
| 4,574,490 | 3/1986 | Curchod | 33/203.18 |
| 4,640,015 | 2/1987 | Mason | 33/203.18 X |

FOREIGN PATENT DOCUMENTS

2356122 2/1978 France .............................. 33/203.18

Primary Examiner—Parshotam S. Lall
Assistant Examiner—Joseph L. Dixon
Attorney, Agent, or Firm—Gravely, Lieder & Woodruff

[57] ABSTRACT

A measuring apparatus for measuring a vehicle wheel alignment characteristic, such as camber, includes a transducer mountable with respect to a vehicle wheel. The transducer has a movable arm repetitively driven along its path of travel to and away from a first predetermined position. Its presence is sensed only at the first predetermined position, the alignment characteristic of the wheel being a function of the time the arm is present there. The transducer generates a digital signal having a duty cycle characteristic of the value of the alignment characteristic being measured. The amount of time the digital signal is in a first state is digitally recorded, as is the amount of time the digital signal is in the opposite state. The value of the alignment characteristic is digitally determined as a function of the two digitally recorded times.

43 Claims, 3 Drawing Sheets

FIG. 3A. ZERO ANGLE.

FIG. 3B. POSITIVE ANGLE, θ.

FIG. 3C. NEGATIVE ANGLE, −θ.

FIG. 4.

VEHICLE WHEEL ALIGNMENT TRANSDUCER, SYSTEM AND METHOD

BACKGROUND OF THE INVENTION

1. Field of the Invention

This invention relates to testing and measuring apparatus and more particularly to an apparatus and method for measuring an alignment characteristic such as camber of a vehicle wheel.

2. Description of the Prior Art

Numerous prior patents have addressed the problem of accurately and efficaciously measuring vehicle wheel alignment characteristics such as camber. For example, U.S. Pat. No. 3,199,208 to Hunter discloses a vehicle wheel alignment apparatus for measuring a number of alignment characteristics including camber, caster, king pin inclination, and wheel toe, all of which are defined in that patent.

Camber angles in particular have in the past been determined by devices based upon the use of light beams, such as those shown in U.S. Pat. Nos. 3,337,961 to Holub and 3,552,024 to Hunter. Such light-beam based systems for measuring camber can be of some complexity as shown in U.S. Pat. No. 4,192,074 to Chang. Light-beam based systems are also known for compensating for the various wheel alignment characteristics. For example, an electronic light-beam based scheme for combined toe and camber compensation is disclosed in U.S. Pat. No. 4,274,738 to Hollandsworth et al.

One traditional way of measuring the camber angle of a vehicle wheel has involved the use of a meter movement having a movable arm subjected externally to the force of gravity and internally to a force created by a current flowing through a coil. When the meter movement is oriented vertically, it is affected by gravity. The resulting gravitational force relates to the camber angle since camber is measured with respect to a vertical reference. The type of meter movement or camber transducer most frequently employed to date incorporates two optical interrupters which are used to detect the position as well as direction of movement of the meter arm. In such devices, the optical interrupters are oriented such that the light beam is normal to the arc traversed by the meter movement arm. This arm in the art is also called a vane or paddle. A good example of a system of this sort is found in U.S. Pat. No. 3,892,042 to Senften. When such a device is oriented properly, the lines of sight of the optical interrupters are angularly displaced by the magnitude of the camber angle.

Systems having two optical interrupters inherently suffer from a number of disadvantage however. In such systems, the spacing between the two interrupters and the tolerance of the vane thickness are critical. Meeting such tolerances is a time-consuming and expensive manufacturing problem.

The methods of exercising the meter movement and monitoring the effect of gravity upon the movement arm have evolved over the years. Some early camber transducers applied a proper DC (direct current) current to the coil of the transducer to displace the arm or vane to a position between two spaced light beams of an optical interrupter. The transducer outputs, in turn, controlled the DC current source in a closed loop which formed a classic analog DC servo control system. The camber angle, derived from any point along the closed loop in these systems, was directly proportional to the DC voltage necessary to generate the current for meter movement. Since the meter movement stimulus was from a DC or slowly changing source, movement of the transducer arm was designedly slow. Unfortunately, with such slow movement, it was difficult to adequately and accurately overcome friction and inertia of the meter movement, both of which may differ at different angles due to imperfections in the movement's pivot point. This property could hide small changes in camber when these previous devices were used.

When such a transducer was used with a digital measuring system, the output of the transducer was then converted to digital form by an analog-to-digital converter. The resulting resolution in these systems is limited by the number of bits "n" in the analog-to-digital converter, and the maximum range, "2R", of the transducer, provided that the output of the transducer varies over the entire input operating range of the analog-to-digital converter. The resolution of the measuring system in such a case is $2R/2^n$. For a transducer having a maximum range of $-10$ to $+10$ degrees, with a ten-bit analog-to-digital converter, the resolution is 20/1024, which equals 0.020 degrees. Using an eight bit analog-to-digital converter in such a system would yield a resolution of 0.078 degrees.

Later systems, in order to eliminate the frictional and inertial problems in the meter movements and to improve the sensitivity of the circuit to small changes in camber, exercised the meter movement with an AC (alternating current) drive. The meter movement arm or vane in these systems dithered back and forth between optical interrupter lines of sight, changing directions based on position detection derived from the optical interrupter outputs. These were classic AC servo control systems. The dither, or vibration, frequency of these systems depended upon the hysteresis in the position detection circuitry, the magnitude of the driving current, and the meter movement characteristics in such systems.

Some older measurement systems included a low pass filter which would generate an average voltage proportional to the average drive current required to maintain equilibrium. This output was then displayed as representative of the camber. This was analogous to the DC servo systems described above.

All the above systems measured and displayed the most recent voltages generated by the camber transducer. The only averaging capabilities of those systems was in any R-C time constants used to filter voltages.

SUMMARY OF THE INVENTION

Among the various objects and features of the present invention may be noted the provision of an improved apparatus for measuring vehicle wheel alignment characteristics such as camber angles.

Another object of the present invention is the provision of such an apparatus with increased accuracy, stability, and resolution.

A third object of the present invention is the provision of such an apparatus with increased reliability.

A fourth object of the present invention is the provision of such an apparatus which is inherently more easily manufactured than prior systems.

A fifth object of the present invention is the provision of such an apparatus having a reduced cost compared with prior systems.

Other objects and features will be in part apparent and in part pointed out hereinafter.

Briefly, the apparatus of the present invention includes a transducer mountable in a fixed geometrical relationship with respect to a vehicle wheel. The transducer is responsive to an alignment characteristic of the vehicle wheel such as camber to generate a digital signal having a duty cycle characteristic of the value of the alignment characteristic being measured. Circuitry responsive to the duty cycle of the digital signal determines the value of the alignment characteristic.

In a second aspect of the present invention a measuring apparatus for measuring an alignment characteristic, such as camber, of a vehicle wheel includes a transducer mountable in a fixed geometrical relationship with respect to a vehicle wheel, which transducer has a movable arm drivable along its path of travel to a first predetermined position. The arm is subjected by gravity to a force tending to make the arm move away from the first predetermined position, the magnitude of the force being a function of an alignment characteristic of the wheel. The movable arm is repetitively driven toward and away from the first predetermined position. Its presence is sensed only at the first predetermined position, the alignment characteristic of the wheel being a function of the time the arm is present at the first predetermined position.

A method of the present invention for measuring an alignment characteristic, such as camber, of a vehicle wheel includes the steps of disposing a movable arm having a pivot point with its pivot point fixed with respect to a wheel whose alignment characteristic is being measured such that the arm is subjected to a force which is a function of the alignment characteristic being measured. The movable arm is repetitively driven along its path to a first predetermined position. The presence of the movable arm is sensed at the first predetermined position. The amount of time the movable arm is present at the first predetermined position is digitally recorded. The movable arm is repetitively driven away from the first predetermined position once the presence of the movable arm is sensed at the first predetermined position. The amount of time the movable arm is absent from the first predetermined position is also digitally recorded. The alignment characteristic of the wheel is then digitally determined as a function of the digitally recorded time the movable arm is present at the first predetermined position and the digitally recorded time the movable arm is absent from the first predetermined position.

In a second aspect, the method of the present invention includes the steps of disposing a transducer in a fixed geometrical relationship with respect to a vehicle wheel whose alignment characteristic is to be measured so that the transducer is responsive to the value of the alignment characteristic. The transducer generates a digital signal having a duty cycle characteristic of the value of the alignment characteristic being measured. The amount of time the digital signal is in a first state is digitally recorded. The amount of time the digital signal is in the opposite state is also separately digitally recorded. The value of the alignment characteristic is digitally determined as a function of the two digitally recorded times.

BRIEF DESCRIPTION OF THE DRAWINGS

Similar reference characters indicate similar parts throughout the various views of the drawings.

DESCRIPTION OF THE PREFERRED EMBODIMENT

Figures 1, 1A, 2, 5:
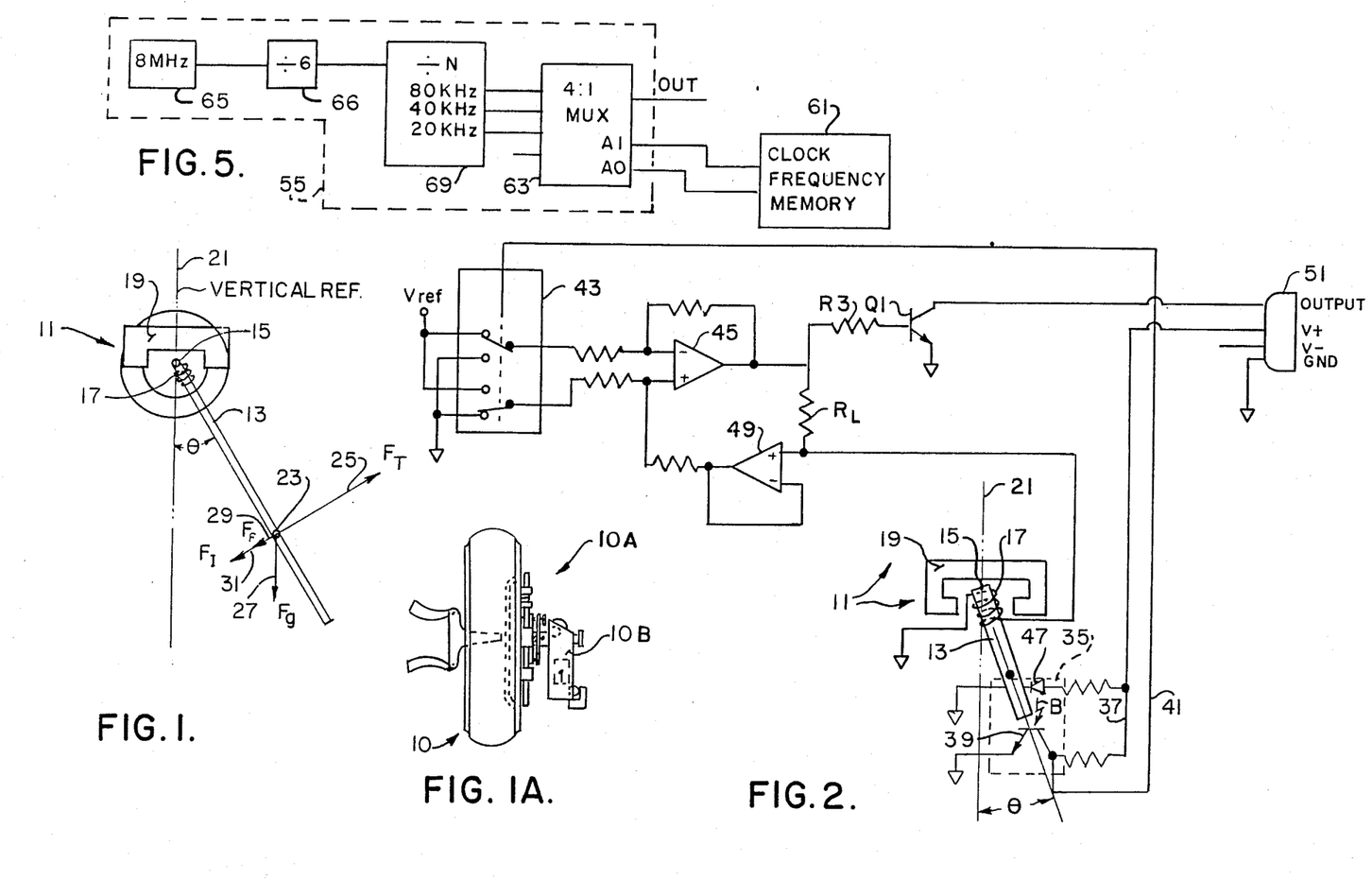
FIG. 1 is a schematic free body diagram of a meter movement incorporated into the apparatus of the present invention.
FIG. 1A is a view of a vehicle wheel with the apparatus of this invention mounted thereon.
FIG. 2 is an electrical schematic of the servo control system of the present invention for the movement of FIG. 1.
FIG. 5 is an electrical schematic illustrating a selectable frequency feature of the system of FIG. 4.

A camber angle measuring transducer 11 of the present invention includes a meter movement vane or arm 13 movable about a pivot point 15 in response to current flow in an armature coil 17 around a magnetic core 19. The vane or arm 13 is intended to move relative to a vertical reference 21 in determining the camber angle, $\theta$. The displacement of vane 13 is the result of the forces shown applied at the center of gravity 23 of the vane.

FIG. 1A illustrates a vehicle wheel 10 having an adapter 10A mounted thereon to support a housing 10B which carries the alignment apparatus of which transducer 11 is a part.

The force $F_T$ due to the displacing torque applied by armature coil 17 to vane 13 is represented in FIG. 1 by arrow 25 directed perpendicularly to vane 13 through center of gravity 23. This applied torque force $F_T$ is opposed by the force of gravity $F_g$, represented in FIG. 1 by arrow 27. The applied torque force $F_T$ is also opposed by a frictional force $F_F$, represented by arrow 29, and a force $F_I$ due to inertia and represented by arrow 31. Vane 13 is shown displaced by the angle $\theta$ as the result of the magnitude of force $F_T$ due to the applied torque, which has overcome the opposing forces of gravity $F_g$, friction $F_F$, and inertia $F_I$.

Vane 13 is in equilibrium when the force $F_T$ due to the applied torque is equal to the sum of the frictional force $F_F$, the inertial force $F_I$, and the gravitational force $F_g$ multiplied by the sine of $\theta$, $F_g\sin(\theta)$.

In the case of an AC servo, such as the system of the present invention, the average vector sum of all tangential forces must equal zero. As the angle $\theta$ formed between the average position of vane 13 and the vertical reference 21 increases in the counterclockwise (positive) direction, the tangential component of the force $F_g$ due to gravity increases. As a result, a larger average force $F_T$ due to the applied torque is required to displace vane 13 through the line of sight of an optical interrupter 35 (FIG. 2). At angles less than ten degrees, the tangential component of the gravitational force $F_g$ can be approximated as linearly proportional to the camber angle $\theta$ (since for small angles the sine of an angle is approximately proportional to the angle) and to the torque applied at equilibrium.

For the meter movement vane 13 to operate properly, the force $F_T$ due to the applied torque must be much larger in magnitude than the frictional force $F_F$ and the inertial force $F_I$. Furthermore, the force $F_T$ must not be so large that it significantly overcomes the tangential component of the gravitational force $F_g$, since otherwise the duty cycle of the output would stay close to fifty percent The drive current in armature coil 17, the mass of vane 13, the construction of transducer 11, and the intended range of the transducer determine how accurate and immune to noise the transducer will be.

Referring now to FIG. 2, the servo system for transducer movement 11 includes optical interrupter 35. On power-up, the optical interrupter 35 will either have its light beam B blocked by vane 13 or it will not. If it is blocked, the output of a phototransistor 39 making up half of optical interrupter 35 becomes greater than $V+/2$ volts. This output is supplied on a line 41 to the direction control input of an analog multiplexer 43. Voltage $V+/2$ is the threshold voltage for the analog multiplexer. This particular output of the phototransistor thus causes multiplexer 43 to supply a reference voltage $V_{ref}$ to the inverting input of an operational amplifier 45. The noninverting input of op amp 45 is at the same time connected by the multiplexer to ground. As a result op amp 45 supplies a positive current through a resistor $R_L$ to armature coil 17. This current has a magnitude of $V_{ref}/R_L$, and causes the vane to move in the direction to unblock optical interrupter 35.

Once vane 13 moves to a position that unblocks optical interrupter 35, the light emitting diode (LED) 47 of the optical interrupter illuminates phototransistor 39. Phototransistor 39 then turns on, lowering the direction control signal on line 41 to some value less than $V+/2$ volts. This causes multiplexer 43 to switch and apply the voltage $V_{ref}$ to the noninverting terminal of op amp 45, which results in a negative current of magnitude $V_{ref}/R_L$ being applied by means of amplifier 45 to the armature coil 17. Vane 13 as a result moves to block LED 47 from illuminating phototransistor 39. In this manner switching of the control voltage to multiplexer 43 causes vane 13 to dither continuously and repetitively.

The output of op amp 45 is also connected through a resistor R3, having a resistance much greater than that of resistor R1, to the base of an npn transistor Q1. The voltage on the collector of transistor Q1 is the output of transducer 11, which is supplied to the circuitry of FIG. 4 via a plug 51.

As the frequency of the dithering of vane 13 is increased, the directional control frequency increases. For a given vane movement and current drive, the frequency can be increased by reducing the hysteresis of the direction control input of multiplexer 43. The preferred implementation uses a typical CMOS gate input which has very little hysteresis and switches at $V+/2$. For maximum immunity to external vibrations and oscillations, the movement of vane 13, the current through resistor $R_L$, and input hysteresis characteristics should be selected to achieve a directional control signal which is sinusoidal when the average vane position is the same as vertical reference 21 and has a magnitude from $3V+/4$ to $V+/4$.

Figure 4:
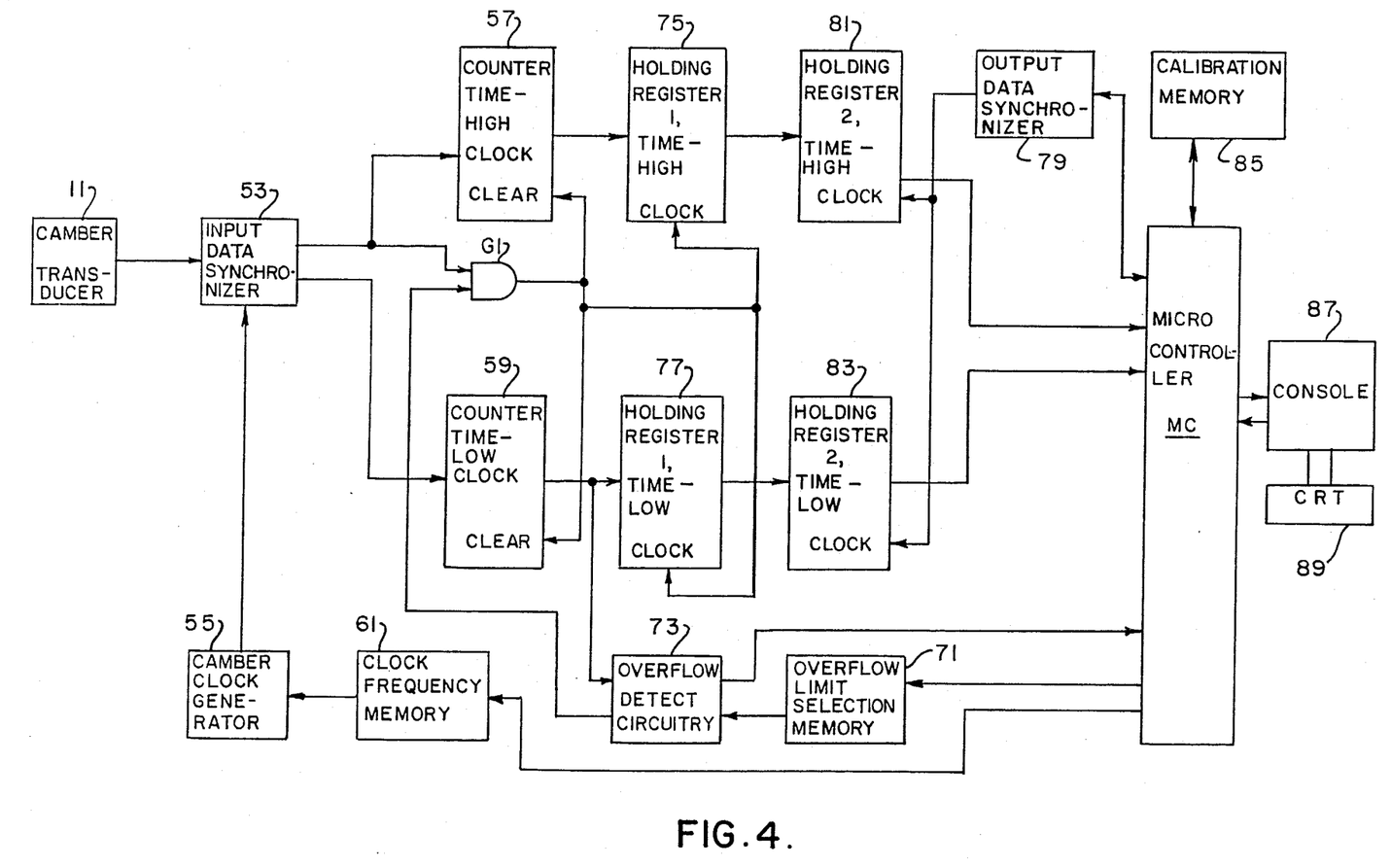
FIG. 4 is a block diagram of circuitry for converting the output of the circuitry of FIG. 2 to a camber angle.

A functional diagram of the circuitry necessary to convert the transducer output at plug 51 into an angle is detailed in FIG. 4. The camber transducer 11 supplies an asynchronous digital waveform input to an input data synchronizer 53. By way of example, input data synchronizer 53 may be simply implemented as a D-type latch, such as half of a 74LS74-type latch, having its D-input connected to the output of transducer 11 and its clock input connected to a system clock such as the camber clock generator 55 shown in FIG. 4.

The waveform from transducer 11 has a duty cycle whose deviation from fifty percent (50%) is directly proportional to the camber angle, $\theta$. The frequency of this waveform is dependent on the individual transducer. Therefore the input of the data synchronizer 53 is asynchronous with respect to camber clock 55. When the input from transducer 11 is high (a logic "1", data synchronizer 53 supplies synchronous clock pulses to the clock input of a time-high counter 57 at a frequency equal to that of camber clock 55. Counter 57 is preferably a high-speed counter capable of counting up to ten thousand or so in one-half second or less. Such a counter is easily implemented using a cascaded set of four 74LS161A-type counters.

When the input to data synchronizer 53 is low (a logic "0"), synchronizer 53 supplies synchronous clock pulses to a second counter, a time-low counter 59. These pulses again are at the frequency of the camber clock. Counter 59 is also easily implemented using a cascaded set of four 74LS161A-type counters.

While one counter is active, the other counter is disabled. This is accomplished by deriving the clocking signal for counter 57 from the Q-output of data synchronizer 53 and the clocking signal for counter 59 from the Q-bar output of the data synchronizer.

The circuitry of FIG. 4 also includes a microcontroller MC, such as an 8051-type microcomputer, which can select camber clock frequencies of 83.3 KHz, 41.7 KHz, and 20.8 KHz. This selection is accomplished by changing the contents of a clock frequency memory 61. As shown in FIG. 5, clock frequency memory 61 (a 74LS374-type chip) is connected to the select pins of a 4:1 multiplexer 63 which makes up part of camber clock 55. Camber clock 55 also includes an eight MHz clock 65 connected through a divide-by-six counter 67 to a divide-by-N counter 69. Counter 69 has its 20 KHz, 40 KHz and 80 KHz outputs connected to the inputs of the 4:1 multiplexer 63, so that the output of multiplexer 63 is the desired frequency signal as determined by clock frequency memory 61.

As the camber transducer vane 13 dithers, time-high counter 57 records the amount of time that the output was a logic "1", and time-low counter 59 records the amount of time that the output was a logic "0". Both counters are sixteen bit counters, allowing for a maximum count of 65,535. To achieve a resolution of 0.001 degrees with a range of ±eight degrees, the angle should be computed after the counters have reached an average count of 10,000. For a transducer vane 13 which dithers at a frequency of 30 Hz and a camber clock 55 with a clock frequency of 20.8 KHz when the average position of the vane intersects the vertical reference, the counters will both reach a count of 10,000 after fifteen dithering operations are complete. This takes one-half second. The resulting camber angle would be of fifteen samples taken over one-half second. The next angle calculated by microcontroller MC is also the average of fifteen new samples, and contains no information from the previous counting cycle. Note that any counting cycle is independent of the actual transducer dithering frequency. This allows for loose manufacturing tolerances, greater producibility and greater reliability.

Figure 3A:
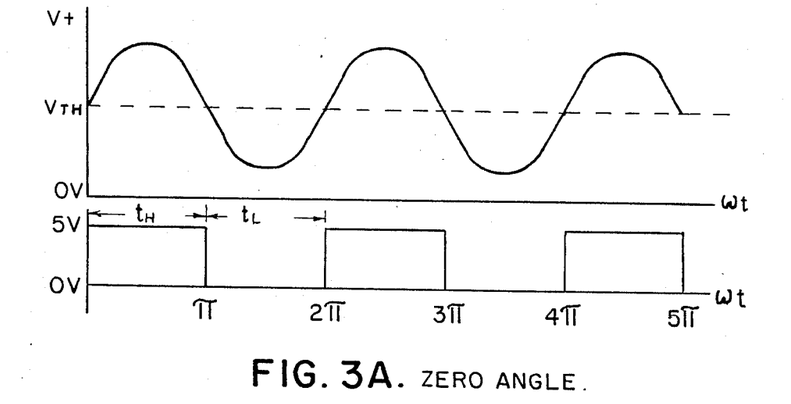
FIG. 3A is a graphical representation of the periodic waveform associated with the movement of FIG. 1 and of the output of the system of FIG. 2 when the average position of the movement arm is the same as a vertical reference.
Figure 3B:
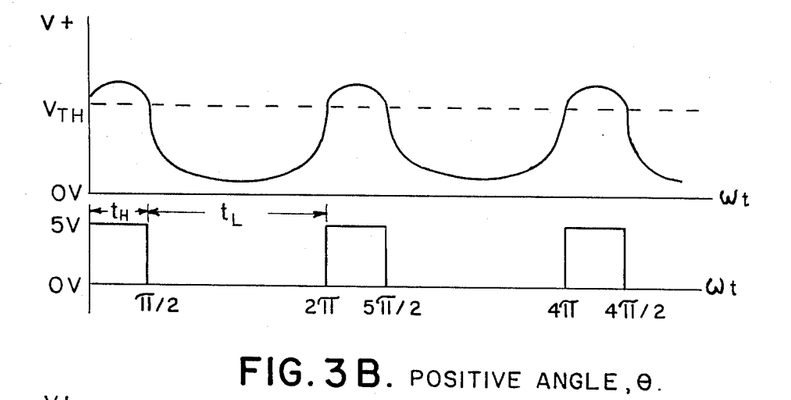
FIG. 3B is a graphical representation of the periodic waveform associated with the movement of FIG. 1 and of the output of the system of FIG. 2 when the angle formed by the intersection of the vertical reference and the average position of the movement arm is in the positive camber direction.

When the average position of the vane of the camber transducer 11 intersects the vertical reference (such an output is illustrated in FIG. 3A), time-high counter 57 and time-low counter 59 contain approximately the same amount of counts at any given time. If, however, the camber transducer is at a different camber angle, $\theta$, one counter will contain more counts than the other after the counting cycle is complete. FIG. 3B shows a case where the output is high one-quarter of the time. In this case when time-low counter 59 reaches 10,000, time-high counter 57 is only at 3333. In this case the average count is only 6666 which decreases the resolution of the angle by 33%. For this reason, microcontroller MC can select the overflow limit for the time-low counter 59. By changing the contents of an overflow limit selection memory 71, the system can guarantee a minimum time-low count at counter 59 of 4096, 6144, 10,240, or 14,336.

Figure 3C:
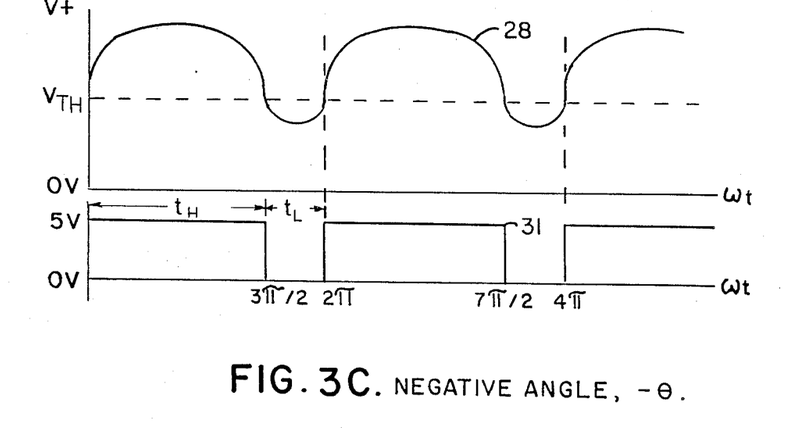
FIG. 3C is a graphical representation of the periodic waveform associated with the movement of FIG. 1 and of the output of the system of FIG. 2 when the angle formed by the intersection of the vertical reference and the average position of the movement arm is in the negative camber direction.

The system of FIG. 4 includes overflow detect circuitry 73 which monitors the counts in time-low counter 59. When counter 59 reaches the overflow limit set by microcontroller MC through overflow limit selection memory 71, overflow detect circuit 73 supplies a signal to that effect to an AND gate G1. The other input to gate G1 is connected to the time-high output of input data synchronizer 53, so when the camber transducer 11 input completes a dither by returning to a logic "1", the output of gate G1 goes High. The output of gate G1 when it goes high causes the contents of counters 57 and 59 to be stored in a bank of holding registers 75 and 77 respectively and the contents of counters 57 and 59 to be cleared. Although the output of gate G1 is shown for clarity in FIG. 4 as being connected directly to the clear inputs of the counters 57 and 59 and the clock inputs of holding registers 75 and 77, it should be understood that the storing of the data in the holding registers takes place before the clearing of the counters. For this purpose, the output of gate G1 is actually supplied through a first D-type latch to clock the holding registers, and the Q-output of that latch is supplied to a second D-type latch to clear the counters one-half clock period later. It is necessary to wait until a dither is completed to insure that the counts reflect the actual duty cycle of the periodic waveforms illustrated in FIG. 3. Also, this allows the digital system to adjust to any reasonable transducer input frequency. After the counts have been saved and the counters cleared, the overflow detect circuitry 73 informs microcontroller MC that new data is available to be processed.

At this point, microcontroller MC has been alerted that new counts exist. When the microcontroller MC is ready, it signals an output data synchronizer 79. Output data synchronizer is preferably made up of two D-type latches connected in series so that the output of the first D-latch changes state before that of the second. The output data synchronizer is connected to the clock inputs of a second pair of holding registers 81 and 83. The appropriate clocking signals from output data synchronizer 79 transfer the data from first holding registers 75 and 77 to second holding registers 81 and 83, without disturbing the current counting operations which are in progress in counters 57 and 59. Output data synchronizer 79 then signals microcontroller MC that all data is latched and ready to be read in. Microcontroller MC then reads, one byte at a time, the raw data from holding registers 81 and 83 it needs to compute the camber angle.

Where other systems have had to convert the duty cycle to an average DC voltage, the present system determines the duty cycle using high speed digital counters, providing a much higher resolution. Since the system is digital, it is not susceptible to noise. Furthermore, the counting operations happen in parallel with any other microcontroller activity, increasing the throughput of the system.

To compute the camber angle, $\theta$, microcontroller MC must recall two constants which are stored in a calibration memory 85. The first, a range constant $K_r$, proportions the angle computations to the actual angle, and the second, an offset constant $K_z$, zero adjusts the angle computation to the actual angle. The camber angle is computed as follows:

Camber angle, $\theta =$ $$K_r * \frac{\text{(time-high count} - \text{time-low count)}}{\text{(time-high count} + \text{time-low count)}} - K_z$$

The angle is then displayed or transmitted to another device such as the system console 87 with CRT display 89 as desired.

For a mechanically compensated system, the wheel, wheel adapter and sensor must have any runout removed mechanically before the angle computed above is valid. In an electronically compensated system, the angle computation should be modified as follows:

Camber angle, $\theta =$ $$K_r * \frac{\text{(time-high count} - \text{time-low count)}}{\text{(time-high count} + \text{time-low count)}} - K_z - K_c$$

where $K_c$ is a compensation constant reflecting the angular runout in the camber plane.

The system of the present invention generates camber angles approximately twice a second, computed to a resolution of 0.001 degrees, over a range of +/− eight degrees. Each new angle represents a hardware average of approximately fifteen samples. As long as the angle processing takes less than 500 msec, all data is used and no data is lost. The system is independent of the transducer frequency and requires very few resources from the microcontroller or any other computer used in the system.

Note that an equivalent transducer can be used to monitor caster adjust. It must be mounted vertically, perpendicular to the camber angle.

Although the circuitry shown in FIGS. 4 and 5 is directed solely to camber, it should be appreciated that a similar circuit with separate channels for caster and camber would function in the same manner to measure both caster and camber. Moreover, such a circuit could be integrated into one application-specific integrated circuit.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed:

1. An apparatus for measuring an alignment characteristic of a vehicle wheel comprising:
   a transducer mountable in a fixed geometrical relationship with respect to a vehicle wheel, said transducer including means responsive to an alignment characteristic of the vehicle wheel for directly generating a digital signal having a duty cycle related to the value of the alignment characteristic being measured; and
   means responsive to the duty cycle of the digital signal for determining the value of the alignment characteristic.

2. The apparatus as set forth in claim 1 wherein the digital signal from the generating means is asynchronous with respect to the determining means, said determining means including means for processing the digital signal into a synchronous signal independently of the average frequency of the asynchronous digital signal over a predetermined range of such frequencies.

3. The apparatus as set forth in claim 1 wherein each period of the digital input signal contains information about the alignment characteristic being measured, said determining means including means for digitally averaging the information from a number of periods of the digital input signal.

4. An apparatus for measuring an alignment characteristic of a vehicle wheel comprising:
   a transducer mountable in a fixed geometrical relationship with respect to a vehicle wheel, said transducer including means responsive to an alignment characteristic of the vehicle wheel for generating a digital signal having a duty cycle related to the value of the alignment characteristic being measured; and
   means responsive to the duty cycle of the digital signal for determining the value of the alignment characteristic;
   said transducer including a movable arm drivable along its path of travel to a first predetermined position, said arm being subjected by gravity to a force tending to make the arm move towards a vertical reference, the magnitude of the force being a function of the alignment characteristic of the vehicle wheel being measured.

5. The apparatus as set forth in claim 4 wherein the digital signal generating means includes means for repetitively driving the movable arm toward and away from the first predetermined position, and means for sensing the presence of the arm only at the first predetermined position, wherein the alignment characteristic of the wheel is a function of the time the arm is present at the first predetermined position.

6. An apparatus for measuring an alignment characteristic of a vehicle wheel comprising:
   a transducer mountable in a fixed geometrical relationship with respect to a vehicle wheel, said transducer including means responsive to an alignment characteristic of the vehicle wheel for generating a digital signal having a duty cycle related to the value of the alignment characteristic being measured; and
   means responsive to the duty cycle of the digital signal for determining the value of the alignment characteristic;
   wherein the alignment characteristic being measured is proportional to the deviation of the duty cycle of the digital signal from fifty percent.

7. An apparatus for measuring an alignment characteristic of a vehicle wheel comprising:
   a transducer mountable in a fixed geometrical relationship with respect to a vehicle wheel, said transducer including means responsive to an alignment characteristic of the vehicle wheel for generating a digital signal having a duty cycle related to the value of the alignment characteristic being measured; and
   means responsive to the duty cycle of the digital signal for determining the value of the alignment characteristic;
   wherein the digital signal from the generating means is asynchronous with respect to the determining means, said determining means including first and second counters and means for supplying synchronous pulses to the first counter while the asynchronous digital signal is in one state and for supplying synchronous pulses to the second counter while the asynchronous digital signal is in the other state.

8. The apparatus as set forth in claim 7 wherein the frequency of the synchronous pulses is much higher than the average frequency of the asynchronous digital input signal.

9. The apparatus as set forth in claim 7 further including means for setting the frequency of the synchronous pulses.

10. The apparatus as set forth in claim 7 wherein the determining means includes first and second registers connected to the first and second counters respectively for storing the contents of the first and second counters upon the occurrence of a predetermined condition.

11. The apparatus as set forth in claim 10 wherein the predetermined condition is the attainment of a predetermined count by one of the counters and the completion of the digital state corresponding to that counter, said determining means including means responsive to the predetermined condition to clock the first and second registers to load the contents of the counters therein and to clear the counters.

12. The apparatus as set forth in claim 11 further including means for changing the predetermined count at which the registers are loaded.

13. An apparatus for measuring an alignment characteristic of a vehicle wheel comprising:
   a transducer mountable in a fixed geometrical relationship with respect to a vehicle wheel, said transducer including means responsive to an alignment characteristic of the vehicle wheel for generating a digital signal having a duty cycle related to the value of the alignment characteristic being measured; and
   means responsive to the duty cycle of the digital signal for determining the value of the alignment characteristic;
   wherein each period of the digital input signal contains information about the alignment characteristic being measured, said determining means including means for digitally averaging the information from a number of periods of the digital input signal; the digital averaging means including a pair of counters for storing information about the duty cycle of the digital signal over a number of periods of the digital signal.

14. The apparatus as set forth in claim 13 wherein the number of periods of the digital signal over which the averaging takes place is determined by one of the pairs of counters reaching a predetermined count, said determining means including a pair of registers into which the contents of the counters are loaded after the completion of the digital signal period once the predetermined count is reached.

15. A measuring apparatus for measuring an alignment characteristic of a vehicle wheel comprising:
   a transducer mountable in a fixed geometrical relationship with respect to a vehicle wheel, said transducer having a movable arm drivable along its path of travel to a first predetermined position, said arm being subjected by gravity to a force tending to make the arm move toward a vertical reference, the magnitude of said force being a function of an alignment characteristic of the wheel;
   means for repetitively driving the movable arm toward and away from the first predetermined position; and
   means for sensing the presence of the arm only at the first predetermined position, the alignment characteristic of the wheel being a function of the time the arm is present at the first predetermined position.

16. The measuring apparatus as set forth in claim 15 wherein the driving means includes an armature magnetically coupled to the movable arm and means for applying current to the armature.

17. The measuring apparatus as set forth in claim 16 wherein the current applying means includes means responsive to the presence sensing means for applying current through the armature in a first direction when the movable arm is present at the first predetermined position and in the opposite direction when the movable arm is absent from the first predetermined position, wherein current flowing through the armature in the first direction drives the movable arm away from the first predetermined position and current flowing though the armature in the opposite direction drives the movable arm toward the first predetermined position.

18. The measuring apparatus as set forth in claim 17 wherein the current applied through the magnet coil is substantially constant in magnitude, said magnitude being independent of the direction of current flow.

19. The measuring apparatus as set forth in claim 15 wherein the sensing means includes means for generating a digital signal having a duty cycle related to the value of the alignment characteristic being measured.

20. The measuring apparatus as set forth in claim 19 wherein the value of the alignment characteristic is proportional to the deviation of the duty cycle of the digital signal from fifty percent.

21. The measuring apparatus as set forth in claim 19 wherein the digital signal from the generating means is asynchronous with respect to the determining means, said determining means including first and second counters and means for supplying synchronous pulses to the first counter while the asynchronous digital signal is in one state and for supplying synchronous pulses to the second counter while the asynchronous digital signal is in the other state.

22. The measuring apparatus as set forth in claim 21 wherein the determining means includes first and second registers connected to the first and second counters respectively for storing the contents of the first and second counters upon the occurrence of a predetermined condition.

23. The measuring apparatus as set forth in claim 22 wherein the predetermined condition is the attainment of a predetermined count by one of the counters and the completion of the digital state corresponding to that counter, said determining means including means responsive to the predetermined condition to clock the first and second registers to load the contents of the counters therein and to clear the counters.

24. The measuring apparatus as set forth in claim 22 further including means for changing the predetermined count at which the registers are loaded.

25. The measuring apparatus as set forth in claim 19 wherein each period of the digital signal contains information about the alignment characteristic being measured, said determining means including means for digitally averaging the information from a number of periods of the digital signal.

26. A method of measuring an alignment characteristic of a vehicle wheel comprising the steps of:
   disposing a movable arm having a pivot point with its pivot point fixed with respect to a wheel whose alignment characteristic is to be measured, such that the arm is subjected to a force which is a function of the alignment characteristic being measured;
   repetitively driving the movable arm along its path to a first predetermined position along its path;
   sensing the presence of the movable arm at the first predetermined position;
   determining and digitally recording the amount of time the movable arm is present at the first predetermined position;
   repetitively driving the movable arm away from the first predetermined position once the presence of the movable arm is sensed at the first predetermined position;
   determining and digitally recording the amount of time the movable arm is absent from the first predetermined position; and
   digitally determining the alignment characteristic of the wheel as a function of the digitally recorded time the movable arm is present at the first predetermined position and the digitally recorded time the movable arm is absent from the first predetermined position.

27. The method as set forth in claim 26 wherein the value of the alignment characteristic being measured is proportional to the deviation of the duty cycle of the digital signal from fifty percent.

28. The method as set forth in claim 26 including the step of generating a digital signal from the sensing of the presence and absence of the movable arm at the first predetermined position, said digital signal being asynchronous with respect to the digitally recording steps, said digitally recording steps including the steps of supplying synchronous pulses to a first counter while the asynchronous digital signal is in one state and supplying synchronous pulses to a second counter while the asynchronous digital signal is in the other state.

29. The method as set forth in claim 28 wherein the frequency of the synchronous pulses is much higher than the average frequency of the asynchronous digital signal.

30. The method as set forth in claim 28 further including setting the frequency of the synchronous pulses based upon the counts in the counters for the previous measurement.

31. The method as set forth in claim 28 wherein the digitally recording steps further include storing the contents of the first and second counters in a pair of holding registers upon the occurrence of a predetermined condition.

32. The method as set forth in claim 31 wherein the predetermined condition is the attainment of a predetermined count by one of the counters and the completion of the digital state corresponding to that counter.

33. The method as set forth in claim 28 wherein each period of the digital signal contains information about the alignment characteristic being measured, wherein the determining step includes digitally averaging the information from a number of periods of the digital signal.

34. The method as set forth in claim 26 wherein the movable arm is driven by applying current to a magnet coil magnetically coupled to the movable arm.

35. The method as set forth in claim 34 wherein the current is applied through the magnet coil in a first direction when the movable arm is present at the first predetermined position and in the opposite direction when the movable arm is absent from the first predetermined position, wherein current flowing through the magnet coil in the first direction drives the movable arm away from the first predetermined position and current flowing through the magnet coil in the opposite direction drives the movable arm toward the first predetermined position.

36. The method as set forth in claim 35 wherein the current applied through the magnet coil is substantially constant in magnitude, said magnitude being independent of the direction of current flow.

37. A method of measuring an alignment characteristic of a vehicle wheel comprising the steps of:
disposing a transducer in a fixed geometrical relationship with respect to a vehicle wheel whose alignment characteristic is to be measured so that the transducer is responsive to the value of the alignment characteristic;
directly generating a digital signal from the transducer having a duty cycle related to the value of the alignment characteristic being measured;
determining and digitally recording the amount of time the digital signal is in a first state;
separately determining and digitally recording the amount of time the digital signal is in the opposite state; and
digitally determining the value of the alignment characteristic as a function of the two digitally recorded times.

38. The method as set forth in claim 37 wherein each period of the digital signal contains information about the alignment characteristic being measured, wherein the determining step includes digitally averaging the information from a number of periods of the digital signal.

39. A method of measuring an alignment characteristic of a vehicle wheel comprising the steps of:
disposing a transducer in a fixed geometrical relationship with respect to a vehicle wheel whose alignment characteristic is to be measured so that the transducer is responsive to the value of the alignment characteristic;
generating a digital signal from the transducer having a duty cycle related to the value of the alignment characteristic being measured;
determining and digitally recording the amount of time the digital signal is in a first state;
separately determining and digitally recording the amount of time the digital signal is in the opposite state; and
digitally determining the value of the alignment characteristic as a function of the two digitally recorded times;
wherein the value of the alignment characteristic being measured is proportional to the deviation of the duty cycle of the digital signal from fifty percent.

40. A method of measuring an alignment characteristic of a vehicle wheel comprising the steps of:
disposing a transducer in a fixed geometrical relationship with respect to a vehicle wheel whose alignment characteristic is to be measured so that the transducer is responsive to the value of the alignment characteristic;
generating a digital signal from the transducer having a duty cycle related to the value of the alignment characteristic being measured;
determining and digitally recording the amount of time the digital signal is in a first state;
separately determining and digitally recording the amount of time the digital signal is in the opposite state; and
digitally determining the value of the alignment characteristic as a function of the two digitally recorded times;
wherein said digital signal is asynchronous with respect to the digitally recording steps, said digitally recording steps including the steps of supplying synchronous pulses to a first counter while the asynchronous digital signal is in one state and supplying synchronous pulses to a second counter while the asynchronous digital signal is in the other state.

41. The method as set forth in claim 40 further including setting the frequency of the synchronous pulses based upon the counts in the counters for the previous measurement.

42. The method as set forth in claim 40 wherein the digitally recording steps further include storing the contents of the first and second counters in a pair of holding registers upon the occurrence of a predetermined condition.

43. The method as set forth in claim 42 wherein the predetermined condition is the attainment of a predetermined count by one of the counters and the completion of the digital state corresponding to that counter.

* * * * *